(12) United States Patent
You et al.

(10) Patent No.: US 12,493,449 B2
(45) Date of Patent: Dec. 9, 2025

(54) RANDOM NUMBER GENERATOR

(71) Applicant: PUFsecurity Corporation, Hsinchu County (TW)

(72) Inventors: Chun-Heng You, Hsinchu County (TW); Chi-Yi Shao, Hsinchu County (TW); Kai-Hsin Chuang, Hsinchu County (TW); Meng-Yi Wu, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 1098 days.

(21) Appl. No.: 17/496,782

(22) Filed: Oct. 8, 2021

(65) Prior Publication Data
US 2022/0261221 A1 Aug. 18, 2022

Related U.S. Application Data

(60) Provisional application No. 63/151,020, filed on Feb. 18, 2021.

(51) Int. Cl.
*G06F 7/58* (2006.01)
*G06F 9/30* (2018.01)

(52) U.S. Cl.
CPC .......... *G06F 7/588* (2013.01); *G06F 9/30134* (2013.01)

(58) Field of Classification Search
CPC ............... G06F 7/58–7/588; G06F 9/30134
See application file for complete search history.

(56) References Cited

U.S. PATENT DOCUMENTS

| 10,078,462 | B2 | 9/2018 | Wang |
| 11,381,394 | B2* | 7/2022 | Wu ................. H04L 9/0894 |
| 2006/0104443 | A1 | 5/2006 | Chari |
| 2009/0204657 | A1* | 8/2009 | Goettfert ............ G06F 7/588 |
| | | | 708/255 |
| 2009/0248771 | A1 | 10/2009 | Vergnes |
| 2014/0040338 | A1 | 2/2014 | Sluis |
| 2018/0287793 | A1 | 10/2018 | Khatib Zadeh |

(Continued)

FOREIGN PATENT DOCUMENTS

| CN | 1914590 A | 2/2007 |
| CN | 102707923 A | 10/2012 |
| CN | 106293617 B | 11/2018 |

(Continued)

*Primary Examiner* — Emily E Larocque
*Assistant Examiner* — Jerome Anthony Klosterman, II
(74) *Attorney, Agent, or Firm* — Winston Hsu

(57) ABSTRACT

A random number generator and a random number generating method are provided. The random number generator includes a first stage generator and a second stage generator. The first stage generator outputs a first random number and a second random number at a first time point and a second time point, respectively. The second stage generator generates a final output at least according to the first random number. More particularly, the second stage generator includes a reseed circuit for generating a reseed signal, to control whether to generate the final output according to the second random number. In addition, when the second stage generator generates the final output at a current data cycle without using the second random number, the first stage generator holds the second random number for generating the final output at a next data cycle.

14 Claims, 12 Drawing Sheets

(56) References Cited

U.S. PATENT DOCUMENTS

2020/0293287 A1* 9/2020 Shao .................. G06F 7/588

FOREIGN PATENT DOCUMENTS

| | | | |
|---|---|---|---|
| CN | 110413257 | A | 11/2019 |
| EP | 0 782 069 | A1 | 7/1997 |
| EP | 3 709 157 | A1 | 9/2020 |
| JP | 2002-278749 | A | 9/2002 |
| JP | 2019-192220 | A | 10/2019 |
| TW | 201901675 | A | 1/2019 |
| TW | 202105168 | A | 2/2021 |
| WO | 2014117695 | A1 | 8/2014 |

* cited by examiner

RANDOM NUMBER GENERATOR

CROSS REFERENCE TO RELATED APPLICATIONS

This application claims the benefit of U.S. provisional application No. 63/151,020, which was filed on Feb. 18, 2021, and is included herein by reference.

BACKGROUND OF THE INVENTION

1. Field of the Invention

The present invention is related to random number generating mechanisms, and more particularly, to a random number generator.

2. Description of the Prior Art

Random number generators are widely utilized in electronic systems, for implementations of information security related functions. Related arts have proposed several random number generating mechanisms for generating random numbers. The random number generating mechanisms have some disadvantages, however. For example, a true random number generator requires at least one entropy source to generate the random numbers, but randomness related quality of the entropy source is typically not good enough to pass testing items defined in National Institute of Standards and Technology (NIST) SP800-90B (e.g., power on test). In addition, a pseudo random number generator may provide a higher output rate of random numbers in comparison with the true random number generator, but a repeated pattern of the random numbers generated by the pseudo random number generator may be an issue in the related art.

Thus, there is a need for a novel architecture of the random number generator and an associated random number generating method, to improve the randomness related quality of the generated random numbers.

SUMMARY OF THE INVENTION

An objective of the present invention is to provide a random number generator, to improve an overall performance of the random number generator without introducing any side effect or in a way that is less likely to introduce side effects.

At least one embodiment of the present invention provides a random number generator. The random number generator comprises a first stage generator and a second stage generator coupled to the first stage generator. The first stage generator is configured to output a plurality of preliminary random numbers comprising a first preliminary random number and a second preliminary random number, wherein the first preliminary random number is outputted at a first time point, and the second preliminary random number is outputted at a second time point after the first time point. The second stage generator is configured to generate a final output at least according to the first preliminary random number. More particularly, the second stage generator comprises a reseed circuit configured to generate a reseed signal, wherein the reseed signal is configured to control whether to generate the final output according to the second preliminary random number. In addition, when the second stage generator generates the final output at a current data cycle of the second stage generator without using the second preliminary random number, the first stage generator holds the second preliminary random number for generating the final output at a next data cycle of the second stage generator.

At least one embodiment of the present invention provides a random number generator. The random number generator comprises a dynamic entropy source, a first stage generator and a second stage generator. The dynamic entropy source is configured to provide a first dynamic entropy bit. The first stage generator comprises a static entropy source and a refresh circuit. The static entropy source is configured to output a first static entropy number and a second static entropy number according to a first address and a second address, respectively, and the refresh circuit is configured to generate a refresh signal, wherein the first stage generator generates a plurality of preliminary random numbers comprising a first preliminary random number and a second preliminary random number, at least according to the first static entropy number, and the refresh signal is configured to control whether to generate the plurality of preliminary random numbers according to the second static entropy number. More particularly, the first preliminary random number is generated at a first time point, and the second preliminary random number is generated at a second time point after the first time point. The second stage generator is coupled to the first stage generator, and is configured to generate a final output at least according to the first preliminary random number. The second stage generator comprises a reseed circuit configured to generate a reseed signal according to a first dynamic entropy bit, wherein the reseed signal is configured to control whether to generate the final output according to the second preliminary random number.

With aid of the output control mechanism of the first stage generator, the quality of the random numbers generated by the random number generator provided by the embodiments of the present invention can be greatly improved. In addition, the field of the random numbers can be greatly extended. Thus, when the random number generator operates under a pseudo random mode, the random numbers output from the random number generator can have a higher quality in comparison with the pseudo random number generator of the related art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
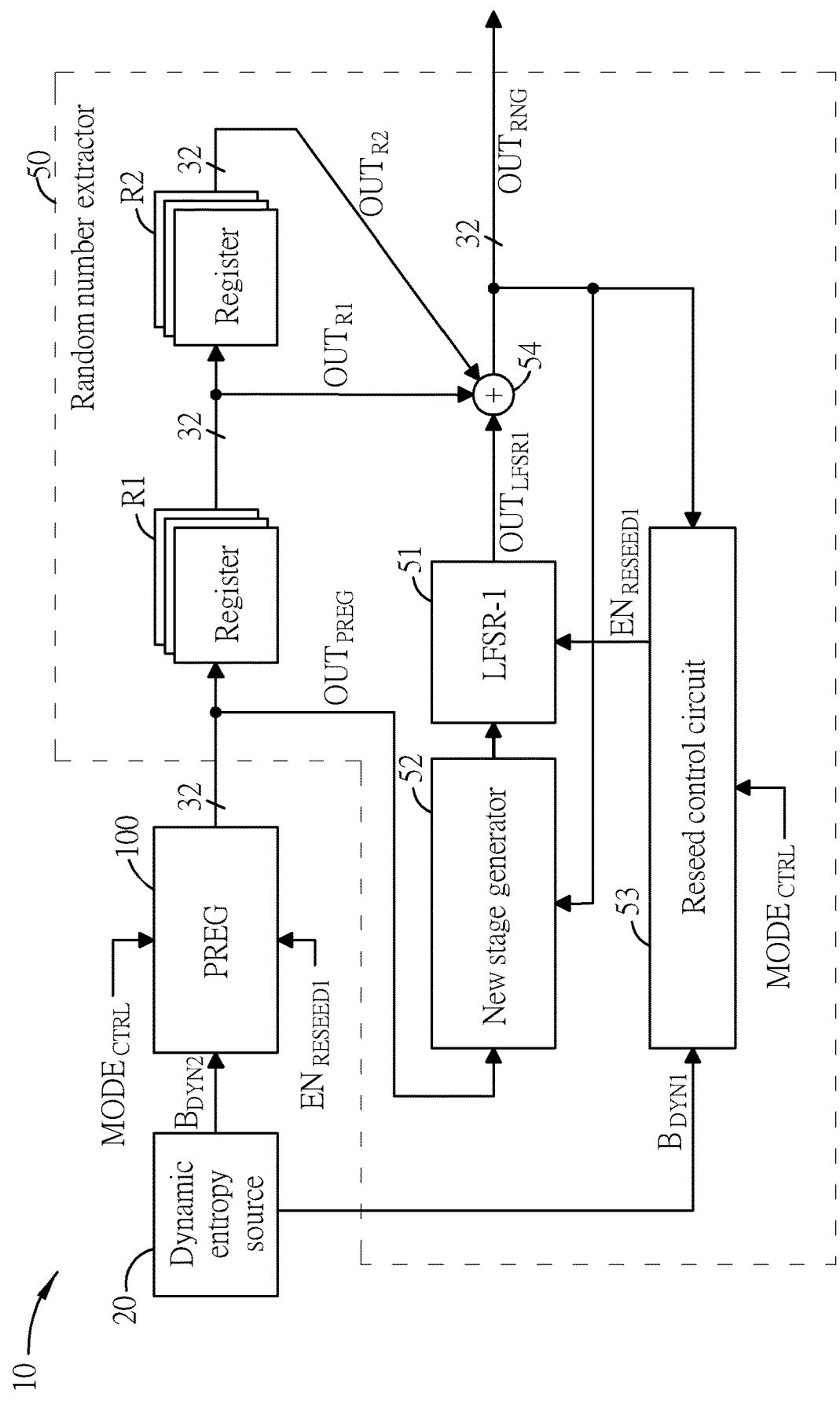
FIG. 1 is a diagram illustrating a random number generator according to an embodiment of the present invention.

FIG. 1 is a diagram illustrating a random number generator 10 according to an embodiment of the present invention. As shown in FIG. 1, the random number generator 10 may comprise a dynamic entropy source 20, a first stage generator such as a Physical Unclonable Function (PUF)-based random essence generator (PREG) 100, and a second stage generator such as a random number extractor 50, where the random number extractor 50 is coupled to the dynamic entropy source 20 and the PREG 100. The dynamic entropy source 20 is configured to provide at least one dynamic entropy bit, for example, to provide a dynamic entropy bit $B_{DYN1}$ to the random number extractor 50 and provide a dynamic entropy bit $B_{DYN2}$ to the PREG 100. The dynamic entropy bit output from the dynamic entropy source 20 may dynamically vary between a first logic value and a second logic value (e.g., varying between "0" and "1") in a random and unpredictable manner. The dynamic entropy source 20 may be implemented by any component that is capable of outputting unpredictable and random signals. Examples of the dynamic entropy source 20 may include, but are not limited to: thermal noise sampling circuit, timing jitter sampling circuit (e.g., ring oscillator), metastability of static random access memory (SRAM) cell, etc.

In some embodiment, the dynamic entropy bit $B_{DYN1}$ and the dynamic entropy bit $B_{DYN2}$ may be identical (e.g., the dynamic entropy source 20 provides the same dynamic entropy bit to both the PREG 100 and the random number extractor 50). In some embodiment, the dynamic entropy bit $B_{DYN1}$ and the dynamic entropy bit $B_{DYN2}$ may be identical (e.g., the dynamic entropy source 20 provides the same dynamic entropy bit to both the PREG 100 and the random number extractor 50). In some embodiment, the dynamic entropy bit $B_{DYN1}$ and the dynamic entropy bit $B_{DYN2}$ may be different from each other. Even if one of the dynamic entropy bit $B_{DYN1}$ and the dynamic entropy bit $B_{DYN2}$ is cracked, as long as the other one is not cracked, at least one dynamic entropy bit is involved and thereby ensures the randomness of overall operations of the random number generator 10. For example, when the dynamic entropy bit $B_{DYN1}$ is cracked but the dynamic entropy bit $B_{DYN2}$ is not cracked, the randomness of operations of the PREG 100 (which will be described in the following paragraphs) can be ensured. In another example, when the dynamic entropy bit $B_{DYN1}$ is cracked but the dynamic entropy bit $B_{DYN2}$ is not cracked, the randomness of operations of the random number extractor 50 can be ensured.

In this embodiment, the PREG 100 is configured to output a preliminary random number such as a random number $OUT_{PREG}$, in which the random number $OUT_{PREG}$ output at a first time point is taken as a first preliminary random number, and the random number $OUT_{PREG}$ output at a second time point is taken as a second preliminary random number. The random number extractor 50 is configured to generate a final output such as a random number $OUT_{RNG}$ at least according to the first preliminary random number. As shown in FIG. 1, the random number extractor 50 may comprise registers R1 and R2, a first linear feedback shift register (LFSR) 51 (labeled "LFSR-1" in FIG. 1 for brevity), a new stage generator 52 (e.g., an exclusive OR logic), a reseed circuit such as a reseed control circuit 53, and a processing circuit 54 (which is illustrated by a circle with "+" therein for brevity).

For example, at a time point t=1 (e.g., at a first output cycle of the PREG 100), the random number $OUT_{PREG}$ output from the PREG 100 is RE[1]; at a time point t=2 (e.g., at a second output cycle of the PREG 100), the random number $OUT_{PREG}$ output from the PREG 100 is RE[2], and RE[1] is stored in the register R1 (e.g., a random number $OUT_{R1}$ output from the register R1 is RE[1]); and at a time point t=3 (e.g., at a third output cycle of the PREG 100), the random number $OUT_{PREG}$ output from the PREG 100 is RE[3], RE[2] is stored in the register R1 (e.g., the random number $OUT_{R1}$ output from the register R1 is RE[2]), and RE[1] is stored in the register R2 (e.g., a random number $OUT_{R2}$ output from the register R2 is RE[1]). Each of the random numbers $OUT_{R1}$ and $OUT_{R2}$ at the time point t=3 (e.g., RE[1] and RE[2]) may be an example of the first preliminary random number, and the random numbers $OUT_{PREG}$ at the time point t=3 (e.g., RE[3]) may be an example of the second preliminary random number.

The reseed control circuit 53 is configured to generate a reseed enable signal $EN_{RESEED1}$ according to the dynamic entropy bit $B_{DYN1}$. For example, the reseed control circuit 53 may generate the reseed enable signal $EN_{RESEED1}$ according to the dynamic entropy bit $B_{DYN1}$ and the random number $OUT_{RNG}$, and more particularly, the reseed enable signal $EN_{RESEED1}$ may be an exclusive-OR (XOR) result of the dynamic entropy bit $B_{DYN1}$ and a predetermined bit among the random number $OUT_{RNG}$ (e.g., a Lth bit of the random number $OUT_{RNG}$, where L is a positive integer), but the present invention is not limited thereto. Based on the processing of the reseed control circuit 53, a low quality (e.g., with unbalanced occurrence rates of "0" and "1") dynamic entropy such as the dynamic entropy bit $B_{DYN1}$ may be mixed with a high quality (e.g., with substantially equal occurrence rates of "0" and "1") random bit such as the predetermined bit among the random number $OUT_{RNG}$ in order to generate a high quality random control bit (e.g., the reseed enable signal $EN_{RESEED1}$) with dynamic entropy involved therein.

In this embodiment, the reseed enable signal $EN_{RESEED1}$ is configured to control whether to generate the random number $OUT_{RNG}$ according to the second preliminary random number. In detail, the reseed enable signal $EN_{RESEED1}$ is configured to control whether to reseed the LFSR 51 with the second preliminary random number to generate an output (e.g., a random number $OUT_{LFSR1}$). Note that, an initial state of an LFSR may be determined by an initial seed, where the LFSR is a shift register whose input bit is a linear function of its previous state, and the linear function is preferably to be defined by a primitive polynomial, which makes states of the LFSR (e.g., outputs of the LFSR) be switched in a predetermined rule corresponding to the primitive polynomial. The first LFSR 51 may be an example of the LFSR, and is configured to output a LFSR random number such as the random number $OUT_{LFSR1}$. When the reseed enable signal $EN_{RESEED1}$ indicates a first logic value (e.g., "0"), the first LFSR 51 outputs the random number $OUT_{LFSR1}$ according to a first predetermined rule (e.g., a rule corresponding to a first primitive polynomial) without using the second preliminary random number such as RE[3], in other words, the first LFSR 51 will not be reseeded. When the reseed enable signal $EN_{RESEED1}$ indicates a second logic value (e.g., "1"), the first LFSR 51 outputs the random number $OUT_{LFSR1}$ according to the second preliminary random number. In detail, the new stage generator 52 may generate a new seed according to the second preliminary random number such as RE[3] and the random number $OUT_{RNG}$ (e.g., the new seed may be an XOR result of RE[3] and the random number $OUT_{RNG}$), and the new seed may be written into the first LFSR 51 to be a next state thereof when the reseed enable signal $EN_{RESEED1}$ indicates the second logic value (e.g., "1"), where this operation may be referred to as reseeding the first LFSR 51. In addition, the processing circuit 54 is configured to generate the random number $OUT_{RNG}$ according to the random numbers $OUT_{R1}$, $OUT_{R2}$ and $OUT_{LFSR1}$. For example, the processing circuit 54 may perform an XOR operation on the random numbers OUTR1 and OUTR2 to generate a preliminary XOR result, and then perform an XOR operation on this preliminary XOR result and the random number $OUT_{LFSR1}$ to generate the random number $OUT_{RNG}$, but the present invention is not limited thereto.

In this embodiment, during an initial procedure of the random number generator 10, the reseed control circuit 53 generates the reseed enable signal $EN_{RESEED1}$ according to the dynamic entropy bit $B_{DYN1}$ for multiple data cycles of the random number extractor 50. During an output procedure of the random number generator 10 after the initial procedure, the random number generator 10 determines whether to operate under a true random number generating (TRNG) mode or a pseudo random number generating (PRNG) mode according to a mode control signal $MODE_{CTRL}$. In detail, each of the PREG 100 and the reseed control circuit 53 may receive the mode control signal $MODE_{CTRL}$ for determining whether to operate under the PRNG mode or the TRNG mode. When the random number generator 10 operates under the TRNG mode (e.g., when the mode control signal $MODE_{CTRL}$ indicates a logic value "0"), the reseed control circuit 53 may generate the reseed enable signal $EN_{RESEED1}$ according to the dynamic entropy bit $B_{DYN1}$ as mentioned above. When the random number generator 10 operates under the PRNG mode (e.g., when the mode control signal $MODE_{CTRL}$ indicates a logic value "1"), the reseed control circuit 53 may generate the reseed enable signal $EN_{RESEED1}$ without using the dynamic entropy bit $B_{DYN1}$ (e.g., the reseed control circuit 53 may output the predetermined bit among the random number $OUT_{RNG}$ mentioned above as the reseed enable signal $EN_{RESEED1}$).

In some embodiment, a quality check circuit (not shown) within the random number generator 10 may be coupled to the processing circuit 54 in order to receive the random number $OUT_{RNG}$ and check a quality of the random number $OUT_{RNG}$ (e.g., checking whether a hamming weight of the random number $OUT_{RNG}$ meets predetermined criteria). If the hamming weight of the random number $OUT_{RNG}$ fails to meet the predetermined criteria, the quality check circuit may issue an alarm to outside of the random number generator 10, to inform a processor coupled to the random number generator 10 that the random number $OUT_{RNG}$ at this moment is not available. In some embodiment, when the processor coupled to the random number generator 10 receives the alarm issued from the quality check circuit, the processor may transmit a reset signal to reset or reboot the random number generator 10, but the present invention is not limited thereto.

Figure 2:
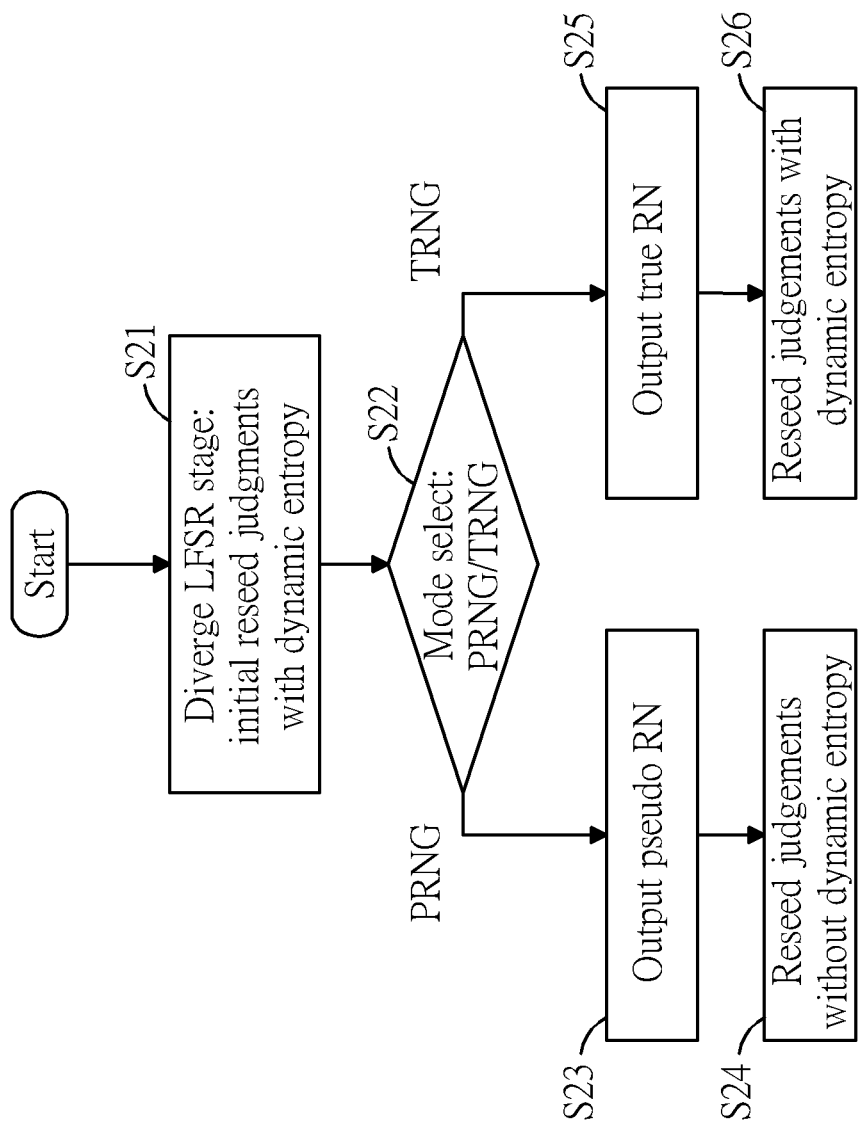
FIG. 2 is a diagram illustrating a working flow of operations of the random number generator shown in FIG. 1 according to an embodiment of the present invention.

FIG. 2 is a diagram illustrating a working flow of operations of the random number generator 10 shown in FIG. 1 according to an embodiment of the present invention, where the working flow is applicable to the random number generator 10 shown in FIG. 1. It should be noted that one or more steps may be added, deleted or modified in the working flow shown in FIG. 2, and these steps do not have to be executed in the exact order shown in FIG. 2 if achieving an overall result is not hindered. For example, the quality check mentioned above may be added in the working flow if needed.

In Step S21, after the random number generator 10 is powered on, the random number generator 10 may utilize initial reseed judgments with dynamic entropy to diverge outputs of the first LFSR 51 stage by stage, wherein this step may be an example of the initial procedure mentioned above, and is labeled "Diverge LFSR stage: initial reseed judgments with dynamic entropy" in FIG. 2 for brevity.

In Step S22, after a field of the outputs of the first LFSR 51 has been extended to a certain level, the random number generator 10 may determine whether to operate under the PRNG mode or under the TRNG mode according to the control signal $MODE_{CTRL}$, wherein this step is labeled "Mode select: PRNG/TRNG" in FIG. 2 for brevity. If the selection is the PRNG mode, the working flow proceeds with Step S23; and if the selection is the TRNG mode, the working flow proceeds with Step S25. Step S22 and the following steps thereof may be an example of the output procedure mentioned above.

In Step S23, the random number generator 10 may start to output pseudo random numbers (labeled "Output pseudo RN" for brevity).

In Step S24, the random number generator 10 may control the reseed control circuit to generate the reseed enable signal $EN_{RESEED1}$ without using the dynamic entropy bit $B_{DYN1}$ (e.g., taking the predetermined bit among the random number $OUT_{RNG}$ to be the reseed enable signal $EN_{RESEED1}$), wherein this step is labeled "Reseed judgments without dynamic entropy" for brevity.

In Step S25, the random number generator 10 may start to output true random numbers (labeled "Output true RN" for brevity).

In Step S26, the random number generator 10 may control the reseed control circuit to generate the reseed enable signal $EN_{RESEED1}$ according to the dynamic entropy bit $B_{DYN1}$ (e.g., taking the XOR result of the dynamic entropy bit $B_{DYN1}$ and the predetermined bit among the random number $OUT_{RNG}$), wherein this step is labeled "Reseed judgments with dynamic entropy".

Figure 3:
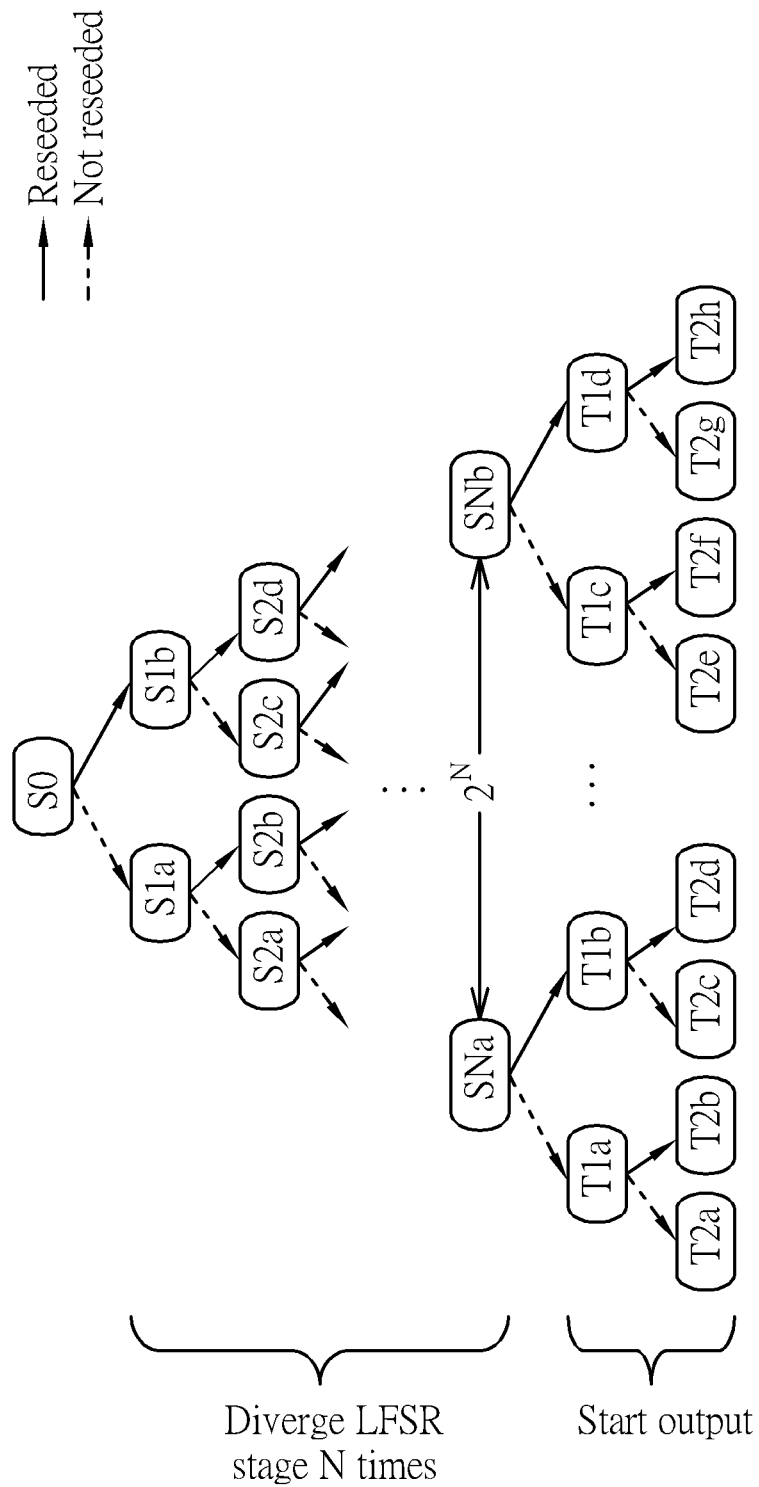
FIG. 3 is a diagram illustrating a diverging scheme of a true random number generating mode according to an embodiment of the present invention.

FIG. 3 is a diagram illustrating a diverging scheme of the TRNG mode according to an embodiment of the present invention. Assume that S0 represents an initial seed of the first LFSR 51, and this initial seed may diverge into two states S1a and S1b respectively in response to the condition of being not reseeded and the condition of being reseeded. When the state of the first LFSR 51 is S1a, the state S1a may diverge into two states S2a and S2b respectively in response to the condition of being not reseeded and the condition of being reseeded. When the state of the first LFSR 51 is S1*b*, the state S1*b* may diverge into two states S2*c* and S2*d* respectively in response to the condition of being not reseeded and the condition of being reseeded. Thus, after N-stage diverging, the initial seed S0 may diverge into $2^N$ states such as SNa to SNb, and the random number generator 10 may start to output random numbers. When the state of the first LFSR 51 is SNa, an output of the random number generator 10 may diverge into two random numbers T1*a* and T1*b* respectively in response to the condition of being not reseeded and the condition of being reseeded. When the state of the first LFSR 51 is SNb, the output of the random number generator 10 may diverge into two random numbers T1*c* and T1*d* respectively in response to the condition of being not reseeded and the condition of being reseeded. Random numbers T2*a*~T2*h* may be diverged in similar way, and are not repeated here for brevity. As shown in FIG. 3, the random number generator 10 can keep extending the field of the output thereof with aid of reseeding judgment mechanism mentioned above under the TRNG mode.

Figure 4:
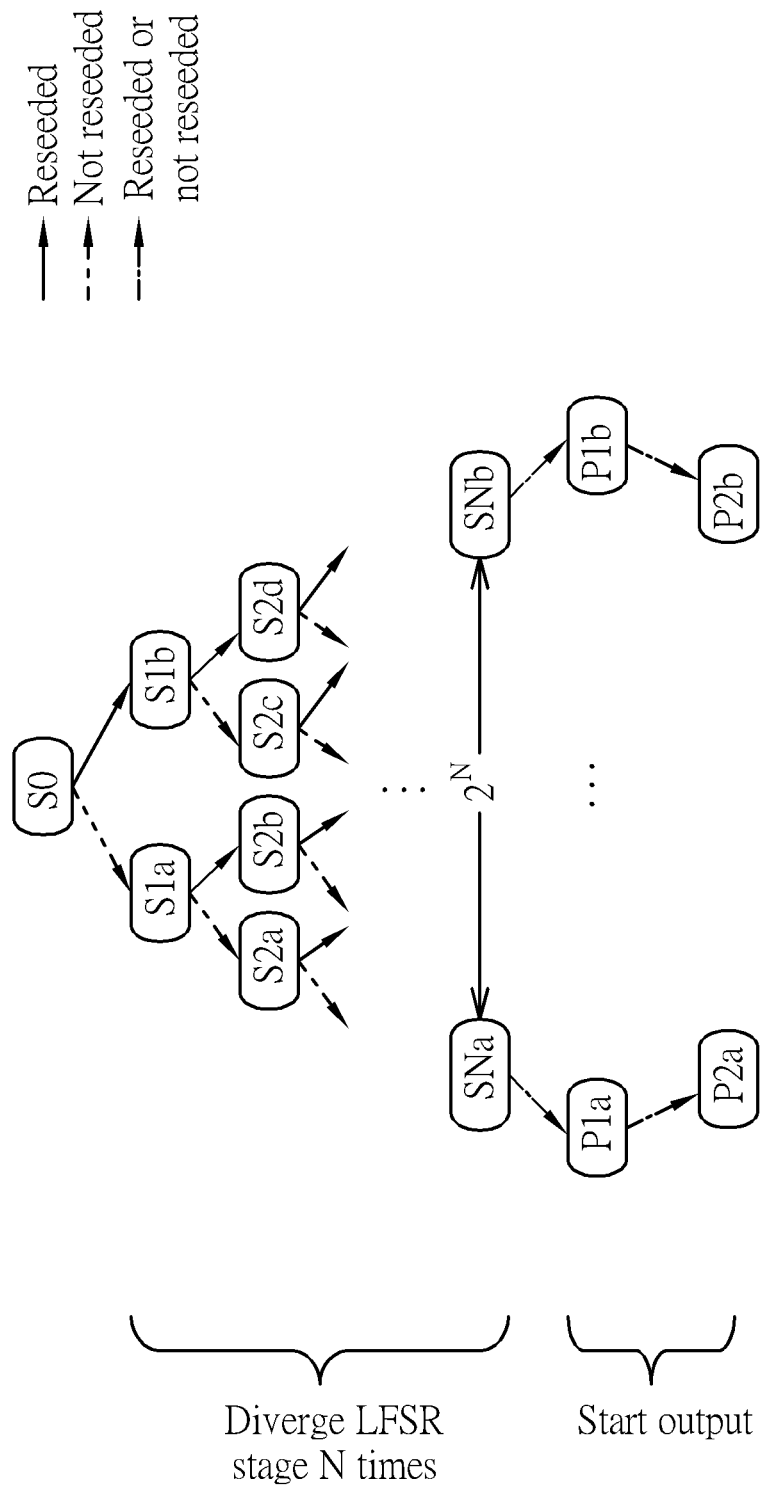
FIG. 4 is a diagram illustrating a diverging scheme of a pseudo random number generating mode according to an embodiment of the present invention.

FIG. 4 is a diagram illustrating a diverging scheme of the PRNG mode according to an embodiment of the present invention, where details of initial N-stage diverging under the PRNG mode are the same as the TRNG mode, and are not repeated here for brevity. After the initial N-stage diverging is finished, the random number generator 10 may stop utilizing the dynamic entropy bit $B_{DYN1}$ for controlling whether to reseed the first LFSR 51. Thus, the reseeding judgments are determined by static entropy only, where this static entropy may be related to a diverging result of the initial N-stage diverging, which is unchanged (stop diverging) after the random number generator 10 stop utilizing the dynamic entropy bit $B_{DYN1}$ for controlling the reseeding judgments. As the reseeding judgments regarding the first LFSR 51 are no longer affected by any dynamic entropy, the first LFSR 51 may act as a static entropy source. In some embodiments, this static entropy may be related to a static entropy source implemented by a PUF array, and will be further described in the following paragraphs related to the details of the PREG 100 shown in FIG. 10. As the dynamic entropy no longer gets involved in the reseeding judgments, the output of the random number with respect to each of the states (e.g., SNa to SNb) of the first LFSR 51 may have a single pattern (e.g., P1*a* to P2*a* with respect to the state SNa, and P1*b* to P2*b* with respect to the state SNb) without diverging. Although the random number generator 10 operating under the PRNG mode cannot keep extending the field of the output thereof after the initial N-stage diverging is finished, output of the random numbers can be performed without spending time for collecting the dynamic entropy, and therefore achieves a higher output rate in comparison with the TRNG mode.

For a purpose of improving performance related to power on test, the PREG 100 is equipped with a random-essence-hold mechanism. In detail, when the random number extractor 50 generates the random number $OUT_{RNG}$ at a current data cycle (e.g., a $T^{th}$ data cycle) of the random number extractor 50 without using the second preliminary random number (e.g., RE[3]), the PREG 100 can hold the second preliminary random number (e.g., RE[3]) for generating the random number $OUT_{RNG}$ at a next data cycle (e.g., a $(T+1)^{th}$ data cycle) of the PREG 100.

Figure 5:
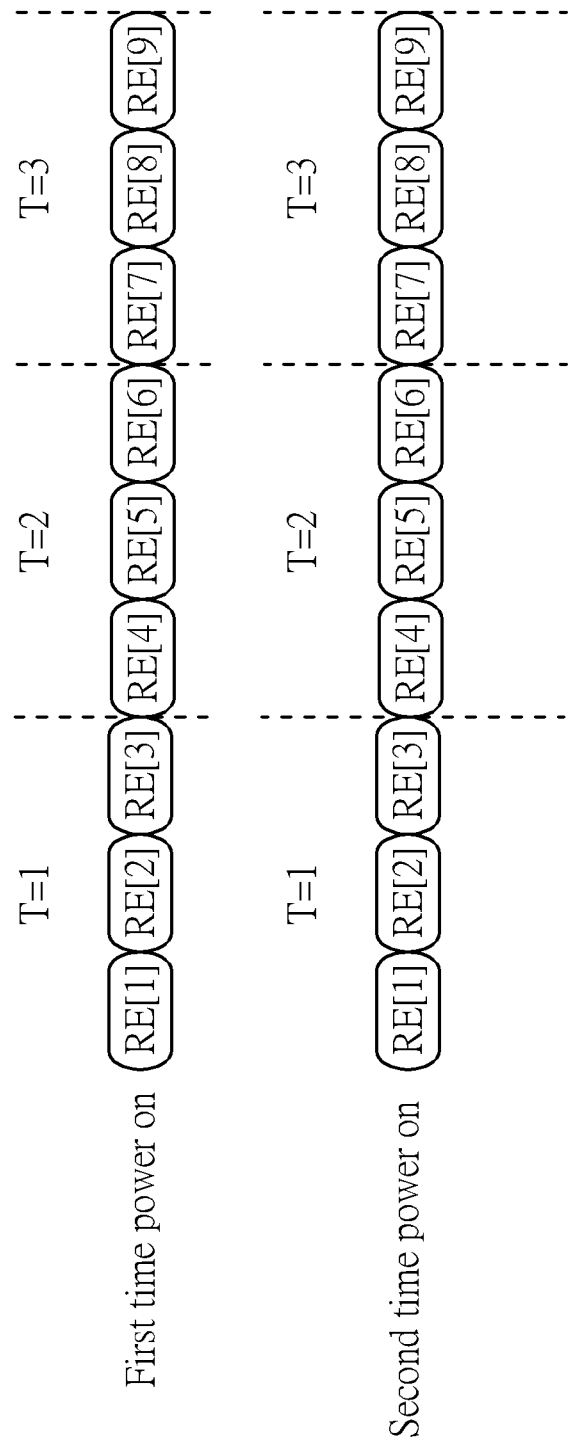
FIG. 5 is a diagram illustrating an output scheme of a PUF-based random essence generator without any random-essence-hold mechanism according to an embodiment of the present invention.

FIG. 5 is a diagram illustrating an output scheme of the PREG 100 without the random-essence-hold mechanism (e.g., the random-essence-hold mechanism is disabled) according to an embodiment of the present invention. For better understanding the impact of a low quality of the dynamic random bit $B_{DYN2}$, it is assumed that the PREG 100 output random numbers based on static entropy therein (e.g., the static entropy source therein such as a PUF array) only. After a first time power on of the random number generator 10, the PREG 100 sequentially outputs random numbers RE[1], RE[2], RE[3], RE[4], RE[5], RE[6], RE[7], RE[8] and RE[9], where the random numbers RE[1], RE[2], RE[3] are arranged for generating the random number $OUT_{RNG}$ at a first data cycle (e.g., T=1), the random numbers RE[4], RE[5], RE[6] are arranged for generating the random number $OUT_{RNG}$ at a second data cycle (e.g., T=2), and the random numbers RE[7], RE[8], RE[9] are arranged for generating the random number $OUT_{RNG}$ at a third data cycle (e.g., T=3). After a second time power on of the random number generator 10, the PREG 100 generates similar outputs or the same outputs as the first time power on due to the low quality of the dynamic random bit $B_{DYN2}$. That is, components for generating the random number $OUT_{RNG}$ at the $T^{th}$ cycle after the first time power on may be similar or identical to components for generating the random number $OUT_{RNG}$ at the $T^{th}$ cycle after the second time power on, and the random number $OUT_{RNG}$ is therefore unable to pass the power on test. Thus, it is preferred to enable the random-essence-hold mechanism.

Figure 6:
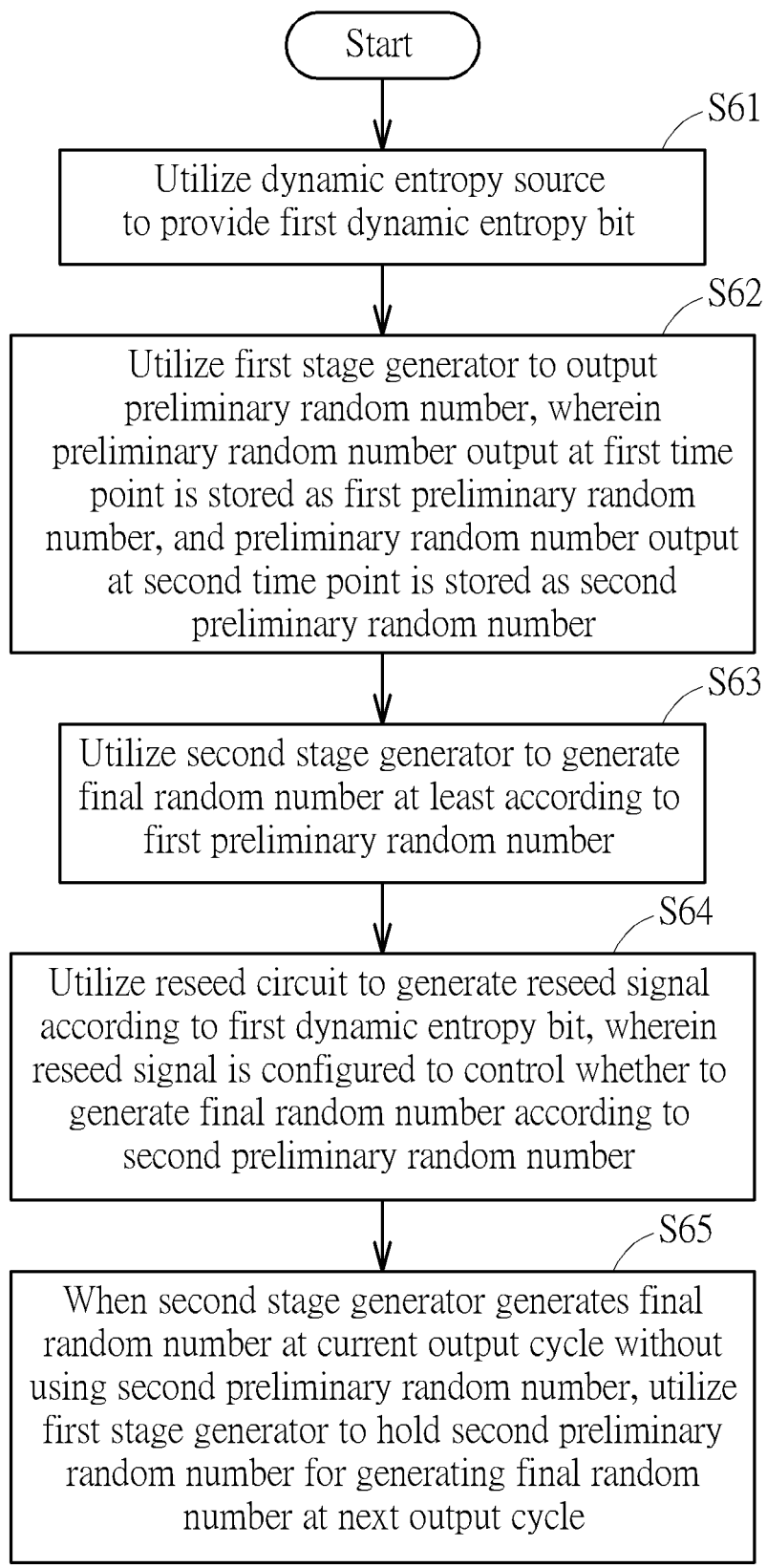
FIG. 6 is a diagram illustrating a working flow of a random number generating method according to an embodiment of the present invention.

FIG. 6 is a diagram illustrating a working flow of a random number generating method according to an embodiment of the present invention, where the working flow is applicable to a random number generator (e.g., the random number generator 10 shown in FIG. 1). It should be noted that one or more steps may be added, deleted or modified in the working flow shown in FIG. 6, and these steps do not have to be executed in the exact order shown in FIG. 6 if achieving an overall result is not hindered.

In Step S61, the random number generator may utilize a dynamic entropy source to provide a first dynamic entropy bit.

In Step S62, the random number generator may utilize a first stage generator to output a preliminary random number, wherein the preliminary random number output at a first time point is taken as a first preliminary random number, and the preliminary random number output at a second time point is taken as a second preliminary random number.

In Step S63, the random number generator may utilize a second stage generator to generate a final random number at least according to the first preliminary random number.

In Step S64, the random number generator may utilize a reseed circuit to generate a reseed signal according to the first dynamic entropy bit, wherein the reseed signal is configured to control whether to generate the final random number according to the second preliminary random number.

In Step S65, when the second stage generator generates the final random number at a current data cycle of the second stage generator without using the second preliminary random number, the random number generator may utilize the first stage generator to hold the second preliminary random number for generating the final random number at a next data cycle of the second stage generator.

Figure 7:
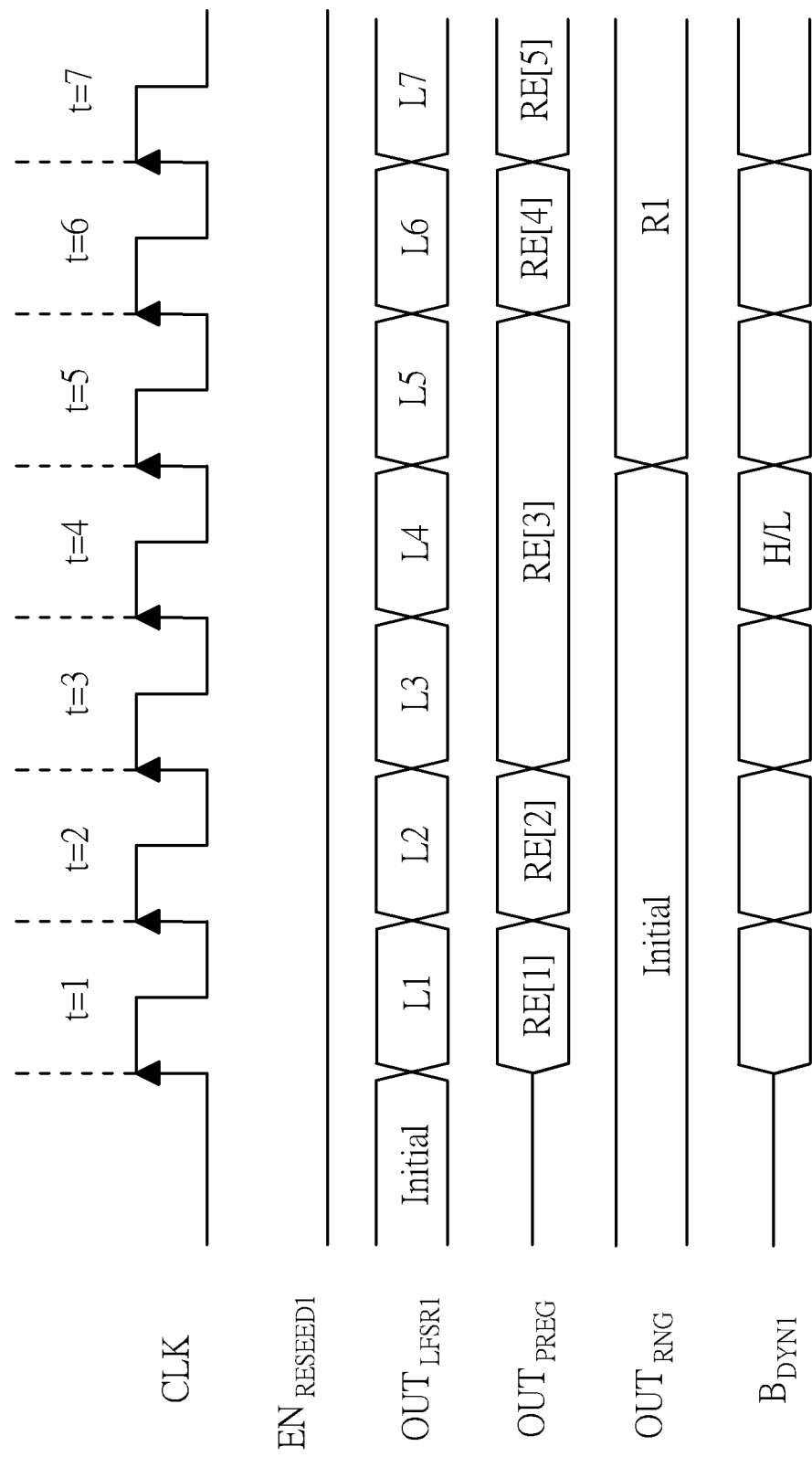
FIG. 7 is a diagram illustrating some signals related to the random number generator shown in FIG. 1 according to an embodiment of the present invention.

For better comprehension, please refer to FIG. 7, which is a diagram illustrating some signals (e.g., a main clock CLK of the random number generator 10, the reseed enable signal $EN_{RESEED1}$, the random number $OUT_{LFSR1}$, the random numbers $OUT_{LFSR1}$, $OUT_{PREG}$ and $OUT_{RNG}$, and the dynamic entropy bit $B_{DYN1}$) related to the random number generator 10 shown in FIG. 1 according to an embodiment of the present invention. Note that the random number $OUT_{RNG}$ is further synchronized by an output clock of the random number extractor 50, in order to make the random number $OUT_{RNG}$ be updated every four cycles of the main clock, where the random number $OUT_{RNG}$ generated at a current data cycle of the output clock may be output at a next data cycle of the output clock. After the random number generator 10 is powered on and before the main clock CLK starts toggling, the random number $OUT_{LFSR1}$ is at an initial state (e.g., the initial seed of the first LFSR 51). The dynamic entropy bit $B_{DYN1}$ may toggle between "0" and "1" (labeled "H/L" in FIG. 7 for better comprehension) in a random manner. In the embodiment of FIG. 7, as the reseed enable signal $EN_{RESEED1}$ is kept at "0", the random number $OUT_{LFSR1}$ output from the first LFSR 51 is switched according to the first predetermined rule (e.g., the first LFSR 51 sequentially outputs L1, L2, L3, L4, L5, L6 and L7 at cycles labeled "t=1", "t=2", "t=3", "t=4", "t=5", "t=6" and "t=7") without any reseeding operation. The PREG 100 sequentially outputs the random numbers RE[1], RE[2] and RE[3], where the random number $OUT_{RNG}$ (e.g., a random number R1 which is output at the cycle labeled "t=5") is generated at a current data cycle without using the random number RE[3], and the PREG 100 can hold the random number RE[3] as shown in FIG. 7, to allow the random number RE[3] to be utilized for generating the random number $OUT_{RNG}$ at a next data cycle.

Figure 8:
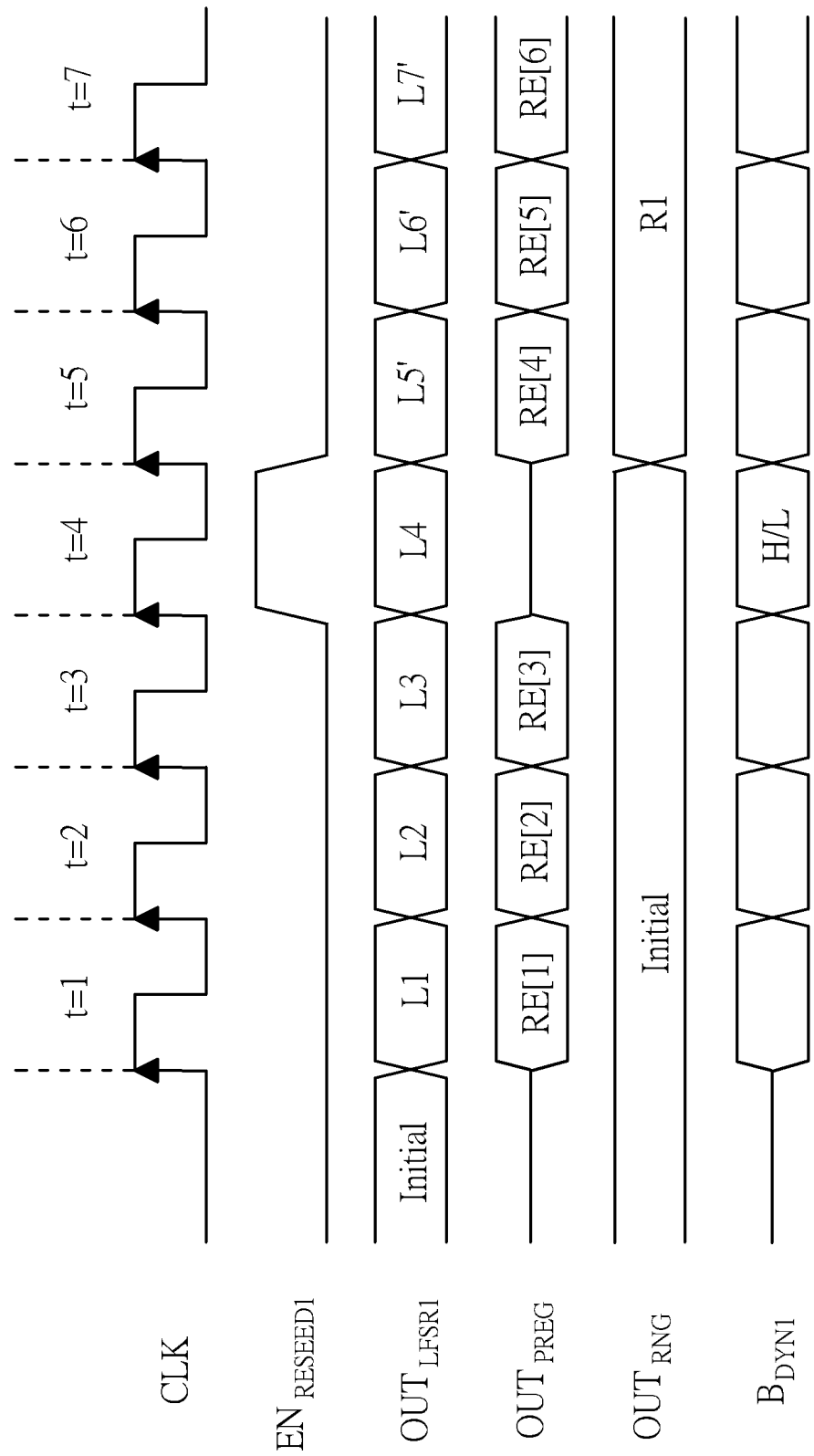
FIG. 8 is a diagram illustrating some signals related to the random number generator shown in FIG. 1 according to another embodiment of the present invention.

Please refer to FIG. 8, which is a diagram illustrating some signals (e.g., a main clock CLK of the random number generator 10, the reseed enable signal $EN_{RESEED1}$, the random numbers $OUT_{LFSR1}$, $OUT_{PREG}$ and $OUT_{RNG}$, and the dynamic entropy bit $B_{DYN1}$) related to the random number generator 10 shown in FIG. 1 according to another embodiment of the present invention. In comparison with the embodiment of FIG. 7, the reseed enable signal $EN_{RESEED1}$ shown in FIG. 8 indicates "1" at the cycle labeled "t=4", and the first LFSR 51 is therefore reseeded and outputs a random number L5' at the cycle labeled "t=5", where the random number $OUT_{LFSR1}$ at cycles labeled "t=6" and "t=7" are L6' and L7', respectively. In addition, as the reseed enable signal $EN_{RESEED1}$ shown in FIG. 8 indicates "1" at the cycle labeled "t=4", which means the random number $OUT_{RNG}$ (e.g., the random number R1 which is output at the cycle labeled "t=5") is generated according to the random numbers RE[1], RE[2], RE[3], the PREG 100 proceeds to output random numbers RE[4], RE[5] and RE[6] at the cycles labeled "t=5", "t=6" and "t=7", respectively.

Figure 9:
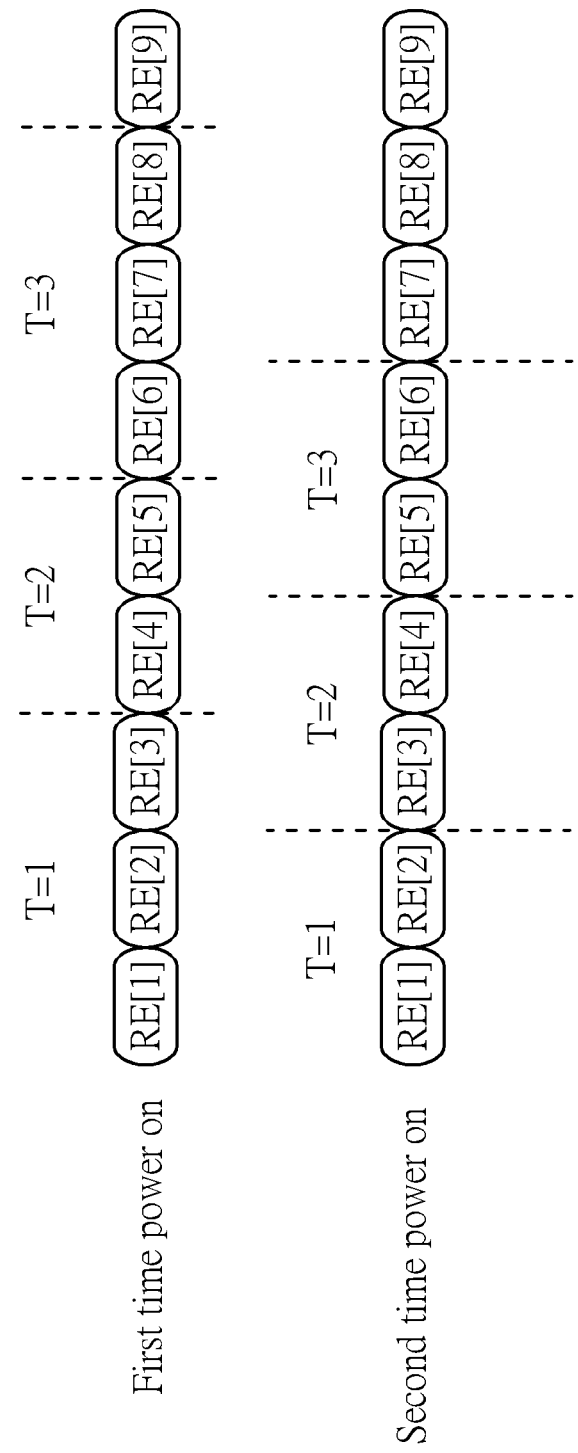
FIG. 9 is a diagram illustrating an output scheme of a PUF-based random essence generator with a random-essence-hold mechanism according to an embodiment of the present invention.

FIG. 9 is a diagram illustrating an output scheme of the PREG 100 with the random-essence-hold mechanism (e.g., the random-essence-hold mechanism is enabled) according to an embodiment of the present invention. At a first data cycle (e.g., T=1) after a first time power on, the PREG 100 outputs the random numbers RE[1], RE[2] and RE[3], where it is assumed that the reseed enable signal $EN_{RESEED1}$ indicates "1" at the first data cycle, which means the random number $OUT_{LFSR1}$ is generated according to the random number RE[3]. Therefore, the random number $OUT_{RNG}$ at the first data cycle would be generated according to the random numbers RE[1] and RE[2] (which corresponds to the outputs of the register R2 and the register R1, respectively) and the random number $OUT_{LFSR1}$ (which is generated according to the random number RE[3]). At a second data cycle (e.g., T=2) after the first time power on, the PREG 100 further outputs the random numbers RE[4], RE[5] and RE[6], where it is assumed that the reseed enable signal $EN_{RESEED1}$ indicates "0" at the second data cycle, which means the random number $OUT_{RNG}$ is generated without using the random number RE[6], and the PREG 100 holds the random number RE[6] for being utilized at a third data cycle (e.g., T=3) after the first time power on. Therefore, the random number $OUT_{RNG}$ at the second data cycle would be generated according to the random numbers RE[4] and RE[5] (which corresponds to the outputs of the register R2 and the register R1, respectively) and the random number $OUT_{LFSR1}$ (which is generated without using the random number RE[6]). At the third data cycle after the first time power on, the PREG 100 further outputs the random numbers RE[7] and RE[8], where it is assumed that the reseed enable signal $EN_{RESEED1}$ indicates "1" at the third data cycle, which means the random number $OUT_{LFSR1}$ is generated according to the random number RE[8]. Therefore, the random number $OUT_{RNG}$ at the third data cycle would be generated according to the random numbers RE[6] and RE[7] (which corresponds to the outputs of the register R2 and the register R1, respectively) and the random number $OUT_{LFSR1}$ (which is generated according to the random number RE[8]).

By comparison, at a first data cycle (e.g., T=1) after a second time power on, the PREG 100 outputs the random numbers RE[1], RE[2] and RE[3], where it is assumed that the reseed enable signal $EN_{RESEED1}$ indicates "0" at the first data cycle, which means the random number $OUT_{RNG}$ is generated without using the random number RE[3], and the PREG 100 holds the random number RE[3] for being utilized at a second data cycle (e.g., T=2). Therefore, the random number $OUT_{RNG}$ at the first data cycle would be generated according to the random numbers RE[1] and RE[2] (which corresponds to the outputs of the register R2 and the register R1, respectively) and the random number $OUT_{LFSR1}$ (which is generated without using the random number RE[3]). At the second data cycle (e.g., T=2) after the second time power on, the PREG 100 further outputs the random numbers RE[4] and RE[5], where it is assumed that the reseed enable signal $EN_{RESEED1}$ indicates "0" at the second data cycle, which means the random number $OUT_{RNG}$ is generated without using the random number RE[5], and the PREG 100 holds the random number RE[5] for being utilized at a third data cycle (e.g., T=3) after the second time power on. Therefore, the random number $OUT_{RNG}$ at the second data cycle would be generated according to the random numbers RE[3] and RE[4] (which corresponds to the outputs of the register R2 and the register R1, respectively) and the random number $OUT_{LFSR1}$ (which is generated without using the random number RE[5]). At the third data cycle (e.g., T=3) after the second time power on, the PREG 100 further outputs the random numbers RE[6] and RE[7], where it is assumed that the reseed enable signal $EN_{RESEED1}$ indicates "0" at the third data cycle, which means the random number $OUT_{RNG}$ is generated without using the random number RE[7], and the PREG 100 holds the random number RE[7] for being utilized at a next data cycle of the third data cycle. Therefore, the random number $OUT_{RNG}$ at the third data cycle would be generated according to the random numbers RE[5] and RE[6] (which corresponds to the outputs of the register R2 and the register R1, respectively) and the random number $OUT_{LFSR1}$ (which is generated without using the random number RE[7]).

As time points of the reseed enable signal $EN_{RESEED1}$ indicating "1" after the first time power on may be different from time points of the reseed enable signal $EN_{RESEED1}$ indicating "1" after the second time power on, components for generating the random number $OUT_{RNG}$ at the $P^{th}$ cycle after the first time power on may be different from components for generating the random number $OUT_{RNG}$ at the $T^{th}$ cycle after the second time power on, and the random number $OUT_{RNG}$ is therefore able to pass the power on test. For example, assuming that the random-essence-hold mechanism is disabled, the random numbers $OUT_{R2}$, $OUT_{R1}$ and $OUT_{PREG}$ at a $N^{th}$ data cycle (e.g., T=N) are always RE[3N−2], RE[3N−1] and RE[3N] for both conditions of the first time power on and the second time power on, respectively, and therefore the random number $OUT_{RNG}$ is always an XOR result of the random numbers RE[3N−2] and RE[3N−1] and the random number $OUT_{LFSR1}$ for both conditions of the first time power on and the second time power on, where if the reseeding event occurs (e.g., the reseed enable signal $EN_{RESEED1}$ indicates "1") at the $N^{th}$ data cycle, the random number being utilized for reseeding the first LFSR 51 will be always RE[3N] for both conditions of the first time power on and the second time power on. In another example, assuming that the random-essence-hold mechanism is enabled as shown in the embodiment of FIG. 9, random numbers being utilized for generating the random numbers $OUT_{RNG}$ at the second data cycle (e.g., T=2) after the first time power on may be RE[4] and RE[5], but random numbers being utilized for generating the random numbers $OUT_{RNG}$ at the second data cycle (e.g., T=2) after the second time power on may be RE[3] and RE[4]. In addition, for a certain data cycle, a random number being utilized by the new stage generator 52 may be unpredictable over different power on events as well. More particularly, the complexity of possible combinations of random numbers being utilized for generating the random number $OUT_{RNG}$ can be increased when T increases (e.g., more data cycles later). Thus, the random-essence-hold mechanism can benefit the result of the power on test.

Figure 10:
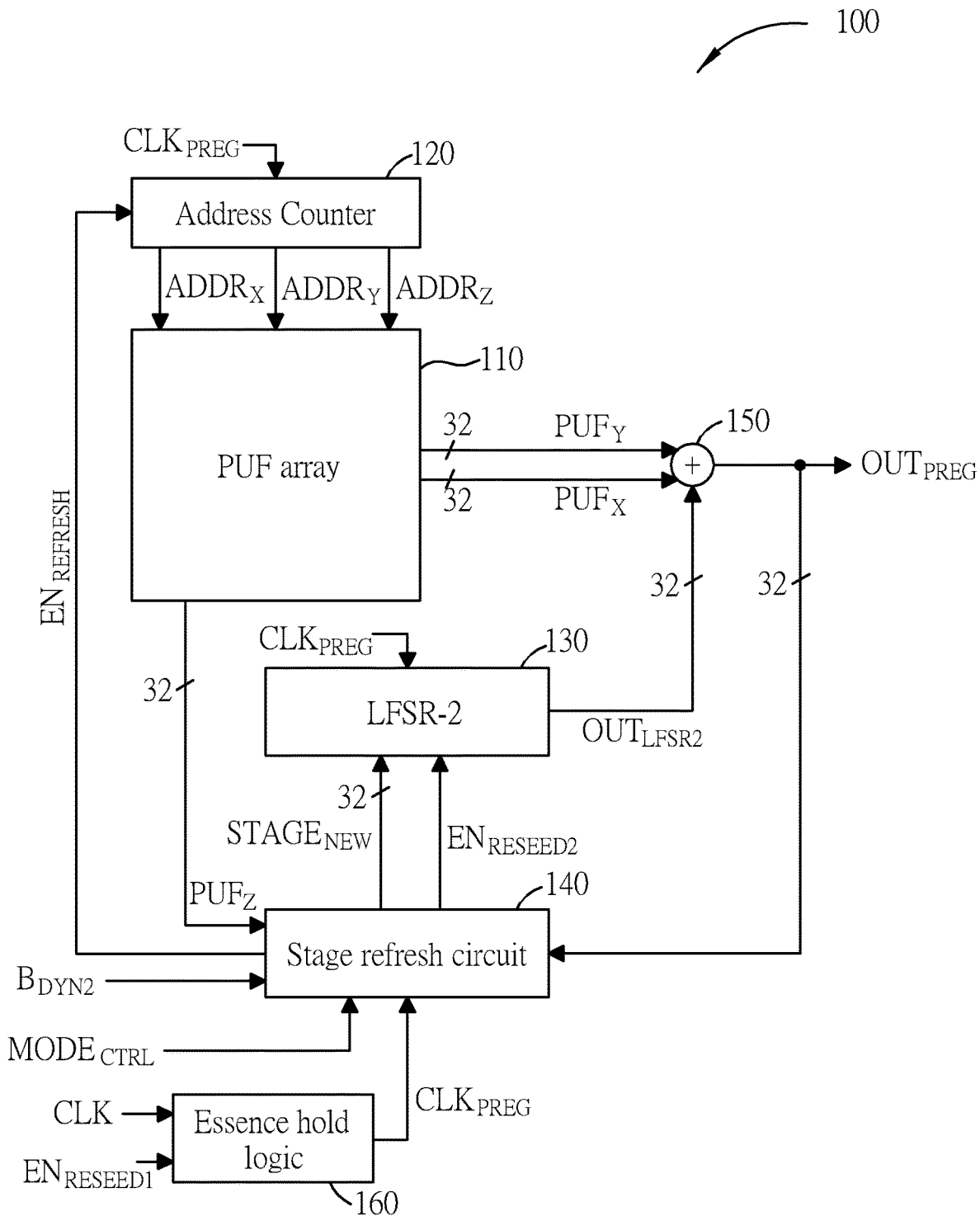
FIG. 10 is a diagram illustrating some details of a PUF-based random essence generator shown in FIG. 1 according to an embodiment of the present invention.

FIG. 10 is a diagram illustrating some details of the PREG 100 shown in FIG. 1 according to an embodiment of the present invention. In this embodiment, the PREG 100 may comprise a static entropy source implemented by a static entropy array such as a PUF array 110, an address counter 120, a second LFSR (labeled "LFSR-2" for brevity) 130, a refresh circuit such as a stage refresh circuit 140, a processing circuit 150 (which is illustrated by a circle with "+" therein for brevity) and a clock control circuit such as an essence hold logic 160. The PUF array 110 may be regarded as an on-chip fingerprint. As physical characteristics of different chips may be slightly different from each other due to some uncontrollable factors in the manufacturing process, these differences are unable to be copied or predicted. In addition, as these physical characteristics would be determined and unchangeable after the chip has been manufactured, the PUF array 110 may be utilized as a "static" entropy source. In some embodiment, the static entropy array may be a register array storing data read from an external PUF array connected to the random number generator 10. In some cases, the speed of reading the register array can be much faster than that of reading the external PUF array. Thus, when the random number generator 10 is powered on, all PUF data stored in the external PUF array may be dumped into the register array first, and all subsequent operations related to the PUF data may be performed by reading the register array, rather than reading the external PUF array, but the present invention is not limited thereto.

Figure 11:
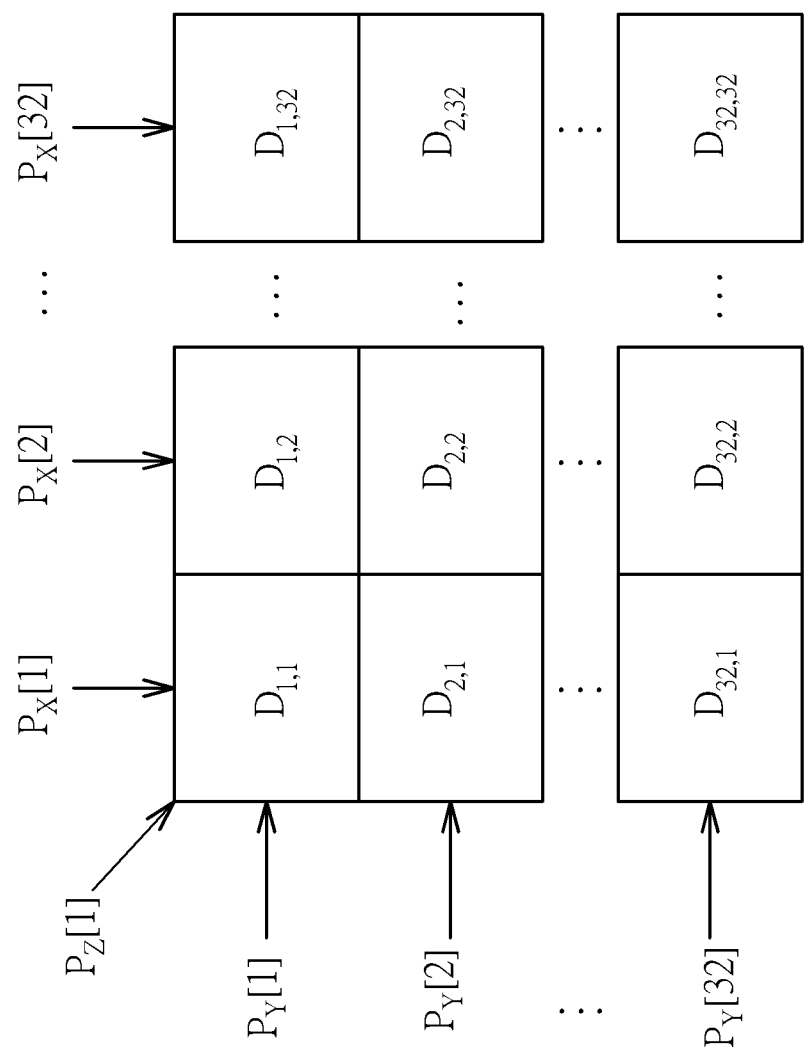
FIG. 11 is a diagram illustrating an output scheme of PUF numbers read from a PUF array according to an embodiment of the present invention.

In this embodiment, the PUF array 110 is configured to output a first static entropy number such as a PUF number PUF according to a first address such as an address $ADDR_X$, output a second static entropy number such as a PUF number $PUF_Y$ according to a second address such as an address $ADDR_Y$, and output a third static entropy number such as a PUF number $PUF_Z$ according to a third address such as an address $ADDR_Z$. The address counter 120 is configured to generate the addresses $ADDR_X$, $ADDR_Y$ and $ADDR_Z$ to control outputs of the PUF numbers $PUF_X$, $PUF_Y$ and $PUF_Z$. For better comprehension, please refer to FIG. 11, which is a diagram illustrating an output scheme of the PUF numbers $PUF_X$, PUF and PUF read from the PUF array 110 according to an embodiment of the present invention. As shown in FIG. 11, data stored in each PUF unit of the PUF array 110 may be illustrated by $D_{RA,CA}$, where RA may represent a row address, and CA may represent a column address. For example, data stored in the first row of PUF units of the PUF array 110 may be $\{D_{1,1}, D_{1,2}, D_{1,3}, \ldots, D_{1,31}, D_{1,32}\}$; data stored in the second row of PUF units of the PUF array 110 may be $\{D_{2,1}, D_{2,2}, D_{2,3}, \ldots, D_{2,31}, D_{2,32}\}$; and the rest can be deduced by analogy, for example, the $32^{th}$ row of PUF units of the PUF array 110 may be $\{D_{32,1}, D_{32,2}, D_{32,3} \ldots, D_{32,31}, D_{32,32}\}$. In addition, the PUF array 110 may output the PUF number PUF by grouping data read from a first group of PUF units within the PUF array 110 which are arranged in a first direction (e.g., arranged in a vertical direction), and the first group of PUF units correspond to the address $ADDR_X$, where values of the address $ADDR_X$ may be represented by nx, and the PUF number $PUF_X$ corresponding to different values of the address $ADDR_X$ may be represented by $\{P_X(nx)|nx=1, 2, 3, \ldots, 32\}=\{D_{1,nx}, D_{2,nx}, D_{3,nx}, \ldots, D_{31,nx}, D_{32,nx}\}$. The PUF array 110 may output the PUF number PUF by grouping data read from a second group of PUF units within the PUF array 110 which are arranged in a second direction (e.g., arranged in a horizontal direction), and the second group of PUF units correspond to the address $ADDR_Y$, where values of the address $ADDR_Y$ may be represented by ny, and the PUF number PUF corresponding to different values of the address $ADDR_Y$ may be represented by $\{P_Y[ny]|ny=1, 2, 3, \ldots, 32\}=\{D_{ny,1}, D_{ny,2}, D_{ny,3}, \ldots, D_{ny,31}, D_{ny,32}\}$. The PUF array 110 may output the PUF number $PUF_Z$ by grouping data read from a third group of PUF units within the PUF array 110 which are arranged in a third direction (e.g., arranged in an askew direction), and the third group of PUF units correspond to the address $ADDR_Z$, where values of the address $ADDR_Z$ may be represented by nz, and the PUF number $PUF_Z$ corresponding to different values of the address $ADDR_Z$ may be represented by $\{P_Z[nz]|nz=1, 2, 3, \ldots, 32\}$. For example, $P_Z[1]=\{D_{1,1}, D_{2,2}, D_{3,3}, \ldots, D_{31,31}, D_{32,32}\}$, $P_Z[2]=\{D_{1,2}, D_{2,3}, D_{3,4}, \ldots, D_{31,32}, D_{32,1}\}$, and the rest can be deduced by analogy, for example, $P_Z[32]=\{D_{1,32}, D_{2,1}, D_{3,2}, \ldots, D_{31,30}, D_{32,31}\}$.

In the embodiment of FIG. 10, the stage refresh circuit 140 is configured to generate a refresh signal according to the dynamic entropy bit $B_{DYN2}$ from the dynamic entropy source 20, where examples of the refresh signal may include a refresh enable signal $EN_{REFRESH}$ and a reseed enable signal $EN_{RESEED2}$, but the present invention is not limited thereto. For example, the stage refresh circuit 140 may generate the refresh signal (e.g., any of the refresh enable signal $EN_{REFRESH}$ and the reseed enable signal $EN_{RESEED2}$) according to the dynamic entropy bit $B_{DYN2}$ and the random number $OUT_{PREG}$, and more particularly, the refresh signal may be an XOR result of the dynamic entropy bit $B_{DYN2}$ and a predetermined bit among the random number $OUT_{PREG}$ (e.g., a $M^{th}$ bit of the random number $OUT_{PREG}$, where M is a positive integer), but the present invention is not limited thereto. Based on the processing of the stage refresh circuit 140, a high quality random number control bit (e.g., any of the refresh enable signal $EN_{REFRESH}$ and the reseed enable signal $EN_{RESEED2}$) with dynamic entropy involved therein can be generated. The PREG 100 generates the random number $OUT_{PREG}$ at least according to the PUF numbers $PUF_X$ and $PUF_Y$, and the refresh signal (e.g., the reseed enable signal $EN_{RESEED2}$) is configured to control whether to generate the random number $OUT_{PREG}$ according to the PUF number $PUF_Z$. The second LFSR 130 may be another example of the LFSR, and is configured to output a LFSR random number such as a random number $OUT_{LFSR2}$. When the refresh signal (e.g., the reseed enable signal $EN_{RESEED2}$) indicates a first logic value (e.g., "0"), the second LFSR 130 outputs the random number $OUT_{LFSR2}$ according to a second predetermined rule (e.g., a rule corresponding to a second primitive polynomial) without using the PUF number $PUF_Z$. It should be noted that the first LFSR 51 and the second LFSR 130 are preferably to be implemented with two different primitive polynomials (e.g., the first primitive polynomial is different from the second primitive polynomial). When the refresh signal (e.g., the reseed enable signal $EN_{RESEED2}$) indicates a second logic value (e.g., "1"), the second LFSR 130 outputs the random number $OUT_{LFSR2}$ according to the PUF number $PUF_Z$. In this embodiment, the stage refresh circuit 140 may generate a new random number $STAGE_{NEW}$ according to the PUF number $PUF_Z$, in order to reseed the second LFSR 130. For example, the stage refresh circuit 140 may generate the new random number $STAGE_{NEW}$ according to the PUF number $PUF_Z$ and the random number $OUT_{PREG}$, (e.g., the new random number $STAGE_{NEW}$ may be an XOR result of the PUF number $PUF_Z$ and the random number $OUT_{PREG}$), but the present invention is not limited thereto. The processing circuit 150 is configured to generate the random number $OUT_{PREG}$ according to the PUF number $PUF_X$, the PUF number PUF and the random number $OUT_{LFSR2}$. For example, the processing circuit 150 may perform an XOR operation on the PUF numbers PUF and PUF to generate a preliminary XOR result, and then perform an XOR operation on this preliminary XOR result and the random number $OUT_{LFSR2}$ to generate the random number $OUT_{PREG}$, but the present invention is not limited thereto.

In addition, each of the addresses $ADDR_X$ and $ADDR_Y$ is refreshed (e.g., increased by one unit step) at each of multiple output cycles of the PREG 100, and the refresh signal (e.g., the refresh enable signal $EN_{REFRESH}$) is further configured to control whether to refresh the address $ADDR_Z$. For example, when the refresh enable signal $EN_{REFRESH}$ indicates a first logic value (e.g., "0"), the address counter 120 prevents refreshing the address $ADDR_Z$, and when the refresh enable signal $EN_{REFRESH}$ indicates a second logic value (e.g., "1"), the address counter refreshes (e.g., increasing by one unit step) the address $ADDR_Z$. The refresh enable signal $EN_{REFRESH}$ is preferably to be correlated with the reseed enable signal $EN_{RESEED2}$. In some embodiment, the stage refresh circuit 140 provides the same enable signal to both the address counter 120 and the second LFSR 130 (e.g., $EN_{REFRESH}=EN_{RESEED2}$), in order to guarantee that the PUF number $PUF_Z$ corresponding to each value of the address $ADDR_Z$ can be utilized without being skipped.

In this embodiment, the stage refresh circuit 140 may receive the mode control signal $MODE_{CTRL}$ for determining whether to operate under the PRNG mode or the TRNG mode. When the random number generator 10 operates under the TRNG mode (e.g., when the mode control signal $MODE_{CTRL}$ indicates a logic value "0"), the stage refresh circuit 140 may generate the refresh signal (e.g., any of the reseed enable signal $EN_{RESEED2}$ and the refresh enable signal $EN_{REFRESH}$) according to the dynamic entropy bit $B_{DYN2}$ as mentioned above. When the random number generator 10 operates under the PRNG mode (e.g., when the mode control signal $MODE_{ST}$ indicates a logic value "1"), the stage refresh circuit 140 may generate the refresh signal (e.g., any of the reseed enable signal $EN_{RESEED2}$ and the refresh enable signal $EN_{REFRESH}$) without using the dynamic entropy bit $B_{DYN2}$ (e.g., the stage refresh circuit 140 may output the predetermined bit among the random number $OUT_{PREG}$ mentioned above as the refresh signal such as any of the reseed enable signal $EN_{RESEED2}$ and the refresh enable signal $EN_{REFRESH}$).

In some embodiments, the PUF array 110 transmits the PUF numbers $PUF_Y$ and $PUF_Z$ to the processing circuit 150, and transmits the PUF number $PUF_X$ to the stage refresh circuit 140, where each of the addresses $ADDR_Y$ and $ADDR_Z$ is refreshed (e.g., increased by one unit step) at each of multiple output cycles of the PREG 100, and the refresh signal (e.g., the refresh enable signal $EN_{REFRESH}$) is configured to control whether to refresh the address $ADDR_X$, but the present invention is not limited thereto. In some embodiments, the PUF array 110 transmits the PUF numbers $PUF_Z$ and $PUF_X$ to the processing circuit 150, and transmits the PUF number $PUF_Y$ to the stage refresh circuit 140, where each of the addresses $ADDR_Z$ and $ADDR_X$ is refreshed (e.g., increased by one unit step) at each of multiple output cycles of the PREG 100, and the refresh signal (e.g., the refresh enable signal $EN_{REFRESH}$) is configured to control whether to refresh the address $ADDR_Y$, but the present invention is not limited thereto.

In addition, the essence hold logic 160 is configured to generate an internal clock $CLK_{PREG}$ according to the reseed enable signal $EN_{RESEED1}$, wherein each of the stage refresh circuit 140, the address counter 120 and the second LFSR 130 operates according to the internal clock $CLK_{PREG}$. When the reseed enable signal $EN_{RESEED1}$ indicates a first logic value (e.g., "0"), which means the random number extractor 50 generates the random number $OUT_{RNG}$ at the current data cycle of the random number extractor 50 without using the second preliminary random number, the essence hold logic may disable the internal clock $CLK_{PREG}$ (e.g., making the internal clock $CLK_{PREG}$ stop toggling) to stop operations of the stage refresh circuit 140, the address counter 120 and the second LFSR 130, in order to hold the second preliminary random number (e.g., hold the random number $OUT_{PREG}$ at a current number such as the second preliminary random number).

Figure 12:
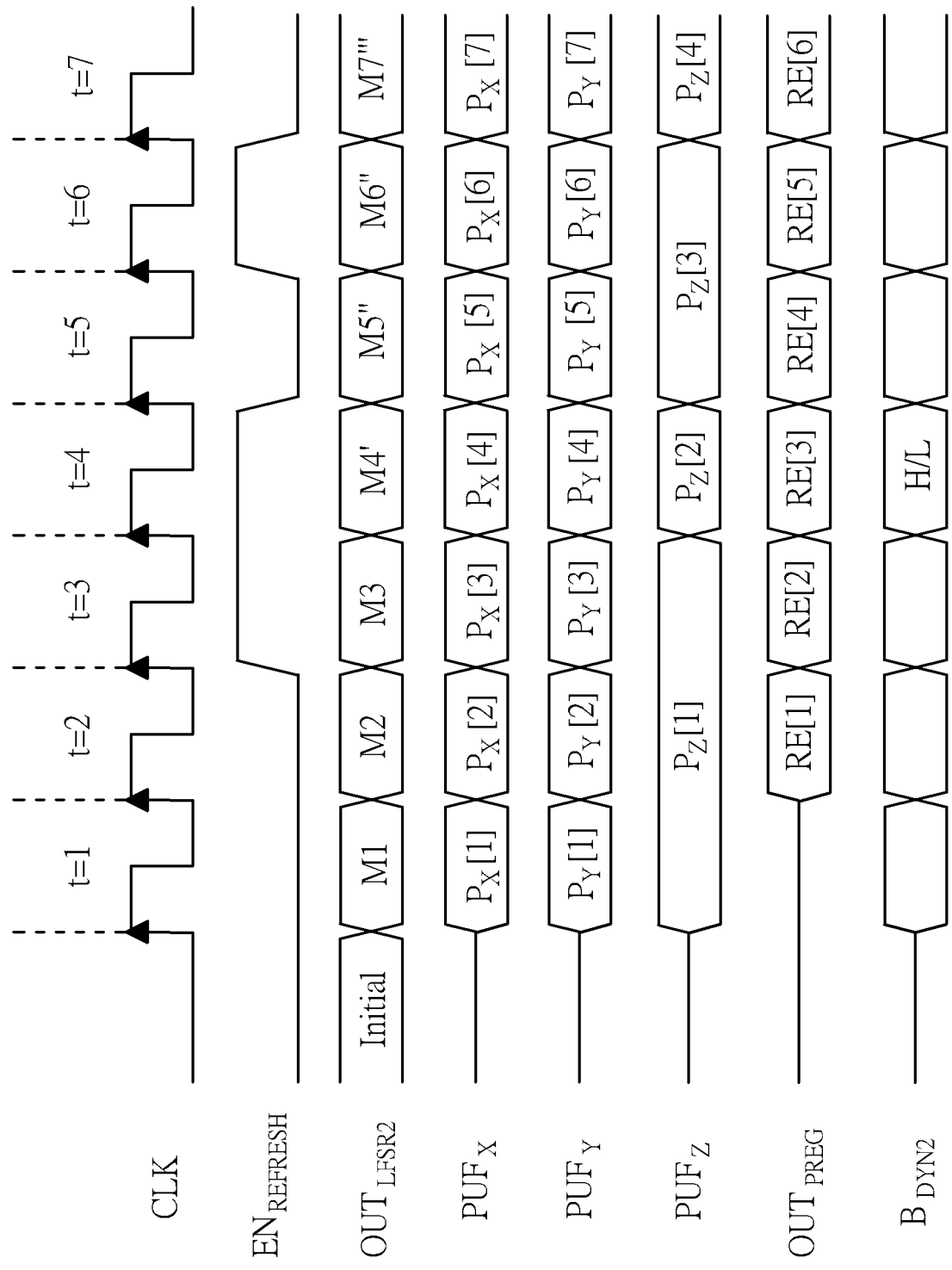
FIG. 12 is a diagram illustrating some signals related to the PUF-based random essence generator shown in FIG. 10 according to an embodiment of the present invention.

FIG. 12 is a diagram illustrating some signals (e.g., the main clock CLK of the random number generator 10, the refresh enable signal $EN_{REFRESH}$, the random numbers $OUT_{LFSR2}$, $PUF_X$, $PUF_Y$, $PUF_Z$ and $OUT_{PREG}$, and dynamic entropy bit $B_{DYN2}$) related to the PREG 100 shown in FIG. 10 according to an embodiment of the present invention. After the random number generator 10 is powered on and before the main clock CLK starts toggling, the random number $OUT_{LFSR2}$ is at an initial state (e.g., an initial seed of the second LFSR 130), and it is assumed that the second LFSR 130 may sequentially output random numbers M1, M2, M3, M4, M5, M6, M7 under a condition where the second LFSR 130 is not reseeded at all. The dynamic entropy bit $B_{DYN2}$ may toggle between "0" and "1" (labeled "H/L" in FIG. 12 for better comprehension) in a random manner. At a cycle labeled "t=1", the random number $PUF_Z$ is $P_Z[1]$, and the second LFSR 130 outputs the random number M1, where the refresh enable signal $EN_{REFRESH}$ indicates "0" (which means the second LFSR 130 will not be reseeded and the random number $PUF_Z$ will not be refreshed at a next cycle). At a cycle labeled "t=2", the random number $PUF_Z$ is kept at $P_Z[1]$, and the second LFSR 130 outputs the random number M2 as the second LFSR 130 is not reseeded, where the refresh enable signal $EN_{REFRESH}$ indicates "0" (which means the second LFSR 130 will not be reseeded and the random number $PUF_Z$ will not be refreshed at a next cycle). At a cycle labeled "t=3", the random number $PUF_Z$ is kept at $P_Z[1]$, and the second LFSR 130 outputs the random number M3 as the second LFSR 130 is not reseeded, where the refresh enable signal $EN_{REFRESH}$ indicates "1" (which means the second LFSR 130 will be reseeded and the random number $PUF_Z$ will be refreshed at a next cycle). At a cycle labeled "t=4", the random number $PUF_Z$ is refreshed as $P_Z[2]$, and the second LFSR 130 outputs the random number M4' as the second LFSR 130 is reseeded (instead of M4 corresponding to a condition where the second LFSR 130 is not reseeded), where the refresh enable signal $EN_{REFRESH}$ indicates "1" (which means the second LFSR 130 will be reseeded and the random number $PUF_Z$ will be refreshed at a next cycle). At a cycle labeled "t=5", the random number $PUF_Z$ is refreshed as $P_Z[3]$, and the second LFSR 130 outputs the random number M5" as the second LFSR 130 is reseeded (instead of M5' corresponding to a condition where the second LFSR 130 is not reseeded), where the refresh enable signal $EN_{REFRESH}$ indicates "0" (which means the second LFSR 130 will not be reseeded and the random number $PUF_Z$ will not be refreshed at a next cycle). At a cycle labeled "t=6", the random number $PUF_Z$ is kept at $P_Z[3]$, and the second LFSR 130 outputs the random number M6" as the second LFSR 130 is not reseeded, where the refresh enable signal $EN_{REFRESH}$ indicates "1" (which means the second LFSR 130 will be reseeded and the random number $PUF_Z$ will be refreshed at a next cycle). At a cycle labeled "t=7", the random number $PUF_Z$ is refreshed as $P_Z[4]$, and the second LFSR 130 outputs the random number M7'" as the second LFSR 130 is reseeded (instead of M7" corresponding to a condition where the second LFSR 130 is not reseeded), where the refresh enable signal $EN_{REFRESH}$ indicates "0" (which means the second LFSR 130 will not be reseeded and the random number $PUF_Z$ will not be refreshed at a next cycle).

The reseeding judgments executed by the reseed control circuit 52 and/or the stage refresh circuit 140 can be configured to change/scramble output patterns of the first LFSR 51 and/or the second LFSR 130. In addition, with aid of the random-essence-hold mechanism, the timing of any random number output from the PREG 100 being utilized for generating the random number $OUT_{RNG}$ can be unpredictable (e.g., RE[5] is utilized in the second cycle after the first time power on but RE[5] is utilized in the third cycle after the second time power on as shown in FIG. 9), which benefits the power on test. Thus, the quality of the random numbers generated by the random number generator with multi-stage (e.g., multi-loop) processing provided by the embodiments of the present invention can be greatly improved. More particularly, even though the quality of the dynamic entropy source within the random number generator is low, as long as at least one of the dynamic entropy bits $B_{DYN1}$ and $B_{DYN2}$ is utilized, the reseeding judgments and the random-essence-hold mechanism can be performed with the benefit of dynamic entropy as mentioned above, and the random number generator still can output high quality random numbers. In addition, the field of the random numbers can be greatly extended. Thus, the quality of random numbers generated based on the PRNG mode can be greatly improved in comparison with the related art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A random number generator, comprising:
a first stage generator circuit, configured to output a plurality of preliminary random numbers comprising a first preliminary random number and a second preliminary random number, wherein the first preliminary random number is outputted at a first time point, and the second preliminary random number is outputted at a second time point after the first time point; and
a second stage generator circuit, coupled to the first stage generator circuit, configured to generate a final output at least according to the first preliminary random number, wherein the second stage generator circuit comprises:
  a reseed circuit, configured to generate a reseed signal, wherein the reseed signal is configured to control whether the second stage generator circuit generates the final output according to the first preliminary random number and the second preliminary random number when generating the final output;
wherein when the second stage generator circuit generates the final output at a current data cycle of the second stage generator circuit without using the second preliminary random number, the first stage generator circuit holds the second preliminary random number for generating the final output at a next data cycle of the second stage generator circuit;
wherein the first stage generator circuit comprises:
  a static entropy array, configured to output a first static entropy number, a second static entropy number and a third static entropy number according to a first address, a second address and a third address, respectively;
  a refresh circuit, configured to generate a refresh signal, wherein the first stage generator circuit generates the plurality of preliminary random numbers at least according to the first static entropy number and the second static entropy number, and the refresh signal is configured to control whether to generate any of the preliminary random numbers according to the third static entropy number;
  a linear feedback shift register (LFSR), configured to output a LFSR random number;
  a processing circuit, configured to generate the preliminary random numbers according to the first static entropy number, the second static entropy number and the LFSR random number, wherein when the refresh signal indicates a first logic value, the LFSR outputs the LFSR random number according to a predetermined rule without using the third static entropy number, and when the refresh signal indicates a second logic value, the LFSR outputs the LFSR random number according to the third static entropy number;
  an address counter, configured to generate the first address, the second address and the third address, wherein each of the first address and the second address is refreshed at each of multiple output cycles of the first stage generator circuit, and the refresh signal is further configured to control whether to refresh the third address; and
  a clock control circuit, configured to generate an internal clock according to the reseed signal, wherein each of the refresh circuit, the address counter and the LFSR operates according to the internal clock, and when the second stage generator circuit generates the final output at the current data cycle of the second stage generator circuit without using the second preliminary random number, the clock control circuit disables the internal clock to stop operations of the refresh circuit, the address counter and the LFSR, in order to hold the second preliminary random number.

2. The random number generator of claim 1, further comprising,
a dynamic entropy source, configured to provide a first dynamic entropy bit and a second dynamic entropy bit;
wherein during a true random number generating (TRNG) mode, the first stage generator circuit is configured to output the preliminary random numbers according to the second dynamic entropy bit, and the reseed circuit of the second stage generator circuit is configured to generate the reseed signal according to the first dynamic entropy bit.

3. The random number generator of claim 1, wherein the second stage generator circuit further comprises:
a linear feedback shift register (LFSR), configured to output a LFSR random number; and
a processing circuit, configured to generate the final output according to the first preliminary random number and the LFSR random number;
wherein when the reseed signal indicates a first logic value, the LFSR outputs the LFSR random number according to a predetermined rule without using the second preliminary random number, and when the reseed signal indicates a second logic value, the LFSR outputs the LFSR random number according to the second preliminary random number.

4. A random number generator, comprising:
a first stage generator circuit, configured to output a plurality of preliminary random numbers comprising a first preliminary random number and a second preliminary random number, wherein the first preliminary random number is outputted at a first time point, and the second preliminary random number is outputted at a second time point after the first time point; and
a second stage generator circuit, coupled to the first stage generator circuit, configured to generate a final output at least according to the first preliminary random number, wherein the second stage generator circuit comprises:
a reseed circuit, configured to generate a reseed signal, wherein the reseed signal is configured to control whether the second stage generator circuit generates the final output according to the first preliminary random number and the second preliminary random number when generating the final output;
wherein when the second stage generator circuit generates the final output at a current data cycle of the second stage generator circuit without using the second preliminary random number, the first stage generator circuit holds the second preliminary random number for generating the final output at a next data cycle of the second stage generator circuit;
wherein the first stage generator circuit comprises:
a static entropy array, configured to output a first static entropy number, a second static entropy number and a third static entropy number according to a first address, a second address and a third address, respectively; and
a refresh circuit, configured to generate a refresh signal;
wherein the first stage generator circuit generates the plurality of preliminary random numbers at least according to the first static entropy number and the second static entropy number, the refresh signal is configured to control whether to generate any of the preliminary random numbers according to the third static entropy number, the static entropy array outputs the first static entropy number by grouping data read from a first group of static entropy units within the static entropy array which are arranged in a first direction, the static entropy array outputs the second static entropy number by grouping data read from a second group of static entropy units within the static entropy array which are arranged in a second direction, and the static entropy array outputs the third static entropy number by grouping data read from a third group of static entropy units within the static entropy array which are arranged in a third direction, wherein the first group of static entropy units, the second group of static entropy units and the third group of static entropy units correspond to the first address, the second address and the third address, respectively.

5. The random number generator of claim 4, wherein the first group of static entropy units are arranged in a vertical direction, the second group of static entropy units are arranged in a horizontal direction, and the third group of static entropy units are arranged in an askew direction.

6. The random number generator of claim 4, wherein the static entropy array is a Physical Unclonable Function (PUF) array or a register array storing data read from a PUF array.

7. A random number generator, comprising:
a dynamic entropy source, configured to provide a first dynamic entropy bit;
a first stage generator circuit, comprising:
a static entropy source, configured to output a first static entropy number and a second static entropy number according to a first address and a second address, respectively; and
a refresh circuit, configured to generate a refresh signal;
wherein the first stage generator circuit generates a plurality of preliminary random numbers comprising a first preliminary random number and a second preliminary random number, at least according to the first static entropy number, and the refresh signal is configured to control whether the first stage generator circuit generates any of the plurality of preliminary random numbers according to the first static entropy number and the second static entropy number when generating the plurality of preliminary random numbers;
wherein the first preliminary random number is generated at a first time point, and the second preliminary random number is generated at a second time point after the first time point; and
a second stage generator circuit, coupled to the first stage generator circuit, configured to generate a final output at least according to the first preliminary random number, wherein the second stage generator circuit comprises:
a reseed circuit, configured to generate a reseed signal according to a first dynamic entropy bit;
wherein the reseed signal is configured to control whether the second stage generates the final output according to the first preliminary random number and the second preliminary random number when generating the final output;

wherein the first stage generator circuit further comprises:
  a linear feedback shift register (LFSR), configured to output a LFSR random output;
  a processing circuit, configured to generate the plurality of preliminary random numbers according to the first static entropy number and the LFSR random output, wherein when the refresh signal indicates a first logic value, the LFSR outputs the LFSR random output according to a predetermined rule without using the second static entropy number, and when the refresh signal indicates a second logic value, the LFSR outputs the LFSR random output according to the second static entropy number;
  an address counter, configured to generate the first address and the second address, wherein the first address is refreshed at each of multiple output cycles of the first stage generator circuit, and the refresh signal is further configured to control whether to refresh the second address; and
  a clock control circuit, configured to generate an internal clock according to the reseed signal, wherein each of the refresh circuit, the address counter and the LFSR operates according to the internal clock, wherein when the second stage generator circuit generates the final output at the current data cycle of the second stage generator circuit without using the second preliminary random number, the clock control circuit disables the internal clock to stop operations of the refresh circuit, the address counter and the LFSR, in order to hold the second preliminary random number.

8. The random number generator of claim 7, wherein when the second stage generator circuit generates the final output at a current data cycle of the second stage generator circuit without using the second preliminary random number, the first stage generator circuit holds the second preliminary random number for generating the final output at a next data cycle of the second stage generator circuit.

9. The random number generator of claim 7, wherein the first stage generator circuit is further configured to generate the plurality of preliminary random numbers according to a second dynamic entropy bit provided by the dynamic entropy source, and the first dynamic entropy bit is different from the second dynamic entropy bit.

10. The random number generator of claim 7, wherein the second stage generator circuit further comprises:
  a linear feedback shift register (LFSR), configured to output a LFSR random output; and
  a processing circuit, configured to generate the final output by calculating the first preliminary random number and the LFSR random output;
  wherein when the reseed signal indicates a first logic value, the LFSR outputs the LFSR random output according to a predetermined rule without using the second preliminary random number, and when the reseed signal indicates a second logic value, the LFSR outputs the LFSR random output according to the second preliminary random number.

11. The random number generator of claim 10, wherein:
  during an initial procedure of the random number generator, the reseed circuit generates the reseed signal according to the first dynamic entropy bit for multiple data cycles of the second stage generator circuit; and
  during an output procedure of the random number generator after the initial procedure, the random number generator determines whether to operate under a true random number generating (TRNG) mode or a pseudo random number generating (PRNG) mode according to a mode control signal.

12. The random number generator of claim 7, wherein the static entropy source is implemented by a static entropy array, the static entropy array outputs the first static entropy number by grouping data read from a first group of static entropy units within the static entropy array which are arranged in a first direction, the static entropy array outputs the second static entropy number by grouping data read from a second group of static entropy units within the static entropy array which are arranged in a second direction;
  wherein:
    the first group of static entropy units and the second group of static entropy units correspond to the first address and the second address, respectively; and
    each of the first direction and the second direction is represented by either a vertical direction, a horizontal direction or an askew direction, and the first group of static entropy units and the second group of static entropy units are arranged in different directions.

13. The random number generator of claim 12, wherein the static entropy source is further configured to output a third static entropy number according to a third address, by grouping data read from a third group of static entropy units within the static entropy array which is arranged in a third direction, the third direction is represented by either the vertical direction, the horizontal direction or the askew direction, wherein the first group of static entropy units, the second group of static entropy units, and the third group of static entropy units are arranged in different direction;
  wherein the first stage generator circuit generates the plurality of preliminary random numbers at least according to the first static entropy number and the third static entropy number.

14. The random number generator of claim 7, wherein the first stage generator circuit is further configured to output a third preliminary random number of the plurality of preliminary random numbers, and the final output is generated at least according to the first preliminary random number and the third preliminary random number, wherein the third preliminary random number is generated at a third time point before the second time point.

* * * * *